(12) United States Patent
Wang

(10) Patent No.: US 6,272,362 B1
(45) Date of Patent: Aug. 7, 2001

(54) HAND-FREE HANDSET FOR USE WITH A CELLULAR TELEPHONE IN AN AUTOMOBILE

(76) Inventor: Chin-Yang Wang, No. 24-110, Shao-An Tsu, Tainan Hsien (TW)

( * ) Notice: Subject to any disclaimer, the term of this patent is extended or adjusted under 35 U.S.C. 154(b) by 0 days.

(21) Appl. No.: 09/329,988

(22) Filed: Jun. 8, 1999

(51) Int. Cl.[7] .................................................. H04Q 7/20
(52) U.S. Cl. .......................................... 455/569; 379/433
(58) Field of Search .................................... 455/550, 559, 455/569, 494, 345; 379/431, 432, 438; 453/346, 99, 95, 430, 431, 433

(56) References Cited

U.S. PATENT DOCUMENTS

| | | | | |
|---|---|---|---|---|
| 4,215,250 | * | 7/1980 | Resener | 381/365 |
| 4,966,164 | * | 10/1990 | Colsen et al. | 607/72 |
| 5,450,496 | * | 9/1995 | Burris et al. | 381/375 |
| 5,613,222 | * | 3/1997 | Guenther | 455/89 |
| 5,687,230 | * | 11/1997 | Alausson et al. | 379/430 |
| 6,047,064 | * | 4/2000 | Lyons | 379/446 |
| 6,108,566 | * | 8/2000 | Albanese | 455/569 |
| 6,154,663 | * | 11/2000 | Itamochi | 455/569 |

* cited by examiner

Primary Examiner—William Trost
Assistant Examiner—Congvan Tran
(74) Attorney, Agent, or Firm—Bacon & Thomas, PLLC

(57) ABSTRACT

A hand-free handset for use with a cellular telephone in an automobile, which includes a mounting device detachably fastened to one stem of the head rest of a vehicle seat, a three-way tubular supporting member fixedly connected to the mounting device, an ear phone and a microphone fixedly mounted on two ends of the three-way tubular supporting member remote from the mounting device, and an electric cable having one end fastened to the inside of the three-way tubular supporting member and connected to the ear phone and the microphone and an opposite end terminating in an electric connector for connection to a signal input/output port of a cellular telephone, wherein the three-way tubular supporting member can be bent to the desired shape, enabling the ear phone and the microphone to be suspended in the air near the user's ear and mouth.

3 Claims, 2 Drawing Sheets

HAND-FREE HANDSET FOR USE WITH A CELLULAR TELEPHONE IN AN AUTOMOBILE

BACKGROUND OF THE INVENTION

The present invention relates to a hand-free handset for use with a cellular telephone in an automobile, and more particularly to such a hand-free handset which can be installed in the driver's seat to suspend an ear phone and a microphone in the air near the driver's ear and mouth, enabling the driver to speak to a person over a cellular telephone without holding the cellular telephone in hand.

An automobile may be equipped with a cellular telephone rack for holding a cellular telephone. An automobile cellular telephone rack is generally mounted on the instrument panel. When the driver wishes to use the cellular telephone, the driver must control the steering wheel with one and, and operate the cellular telephone with the other hand. It is inconvenient and dangerous to use the cellular telephone when driving the automobile. There is known a wired microphone for use with a cellular telephone in an automobile. The wired microphone can be fastened to the driver's dress, so that the driver can speak to a person through the microphone over the cellular telephone. However, the electric wire of the wired microphone tends to be stretched and broken if the driver forgets to disconnect the wired microphone from the dress when leaving from the automobile.

SUMMARY OF THE INVENTION

The present invention has been accomplished under the circumstances in view. According to the present invention, the hand-free handset comprises a mounting device detachably fastened to one stem of the head rest of a vehicle seat, a tubular supporting member fixedly connected to the mounting device, an ear phone and a microphone fixedly mounted on the tubular supporting member, and an electric cable having one end fastened to the inside of the three-way tubular supporting member and connected to the ear phone and the microphone and an opposite end terminating in an electric connector for connection to a signal input/output port of a cellular telephone. The tubular supporting member can be bent to the desired shape, enabling the ear phone and the microphone to be suspended in the air near the user's ear and mouth.

DETAILED DESCRIPTION OF THE PREFERRED EMBODIMENT

Figure 1:
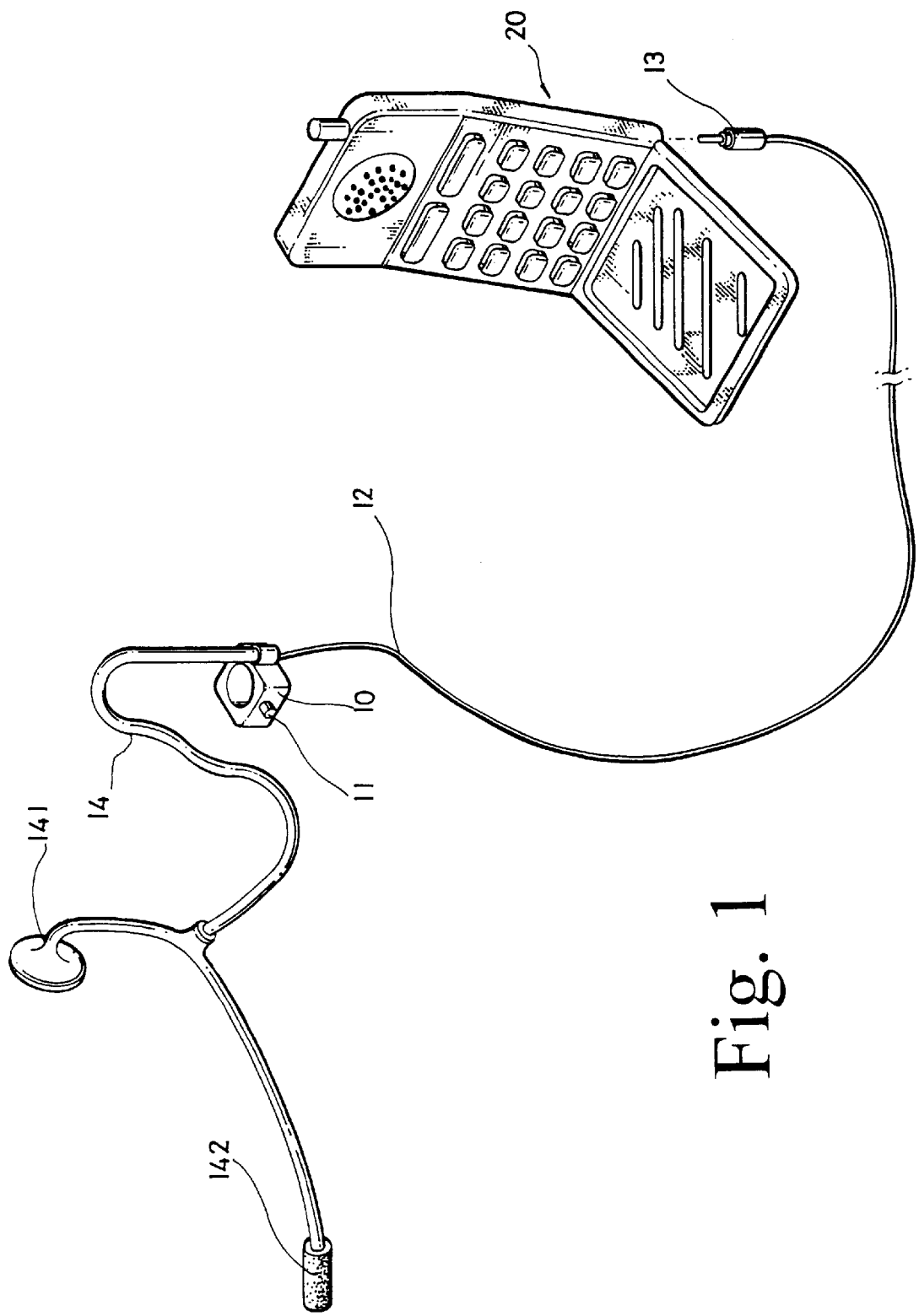
FIG. 1 illustrates a hand-free handset used with a cellular telephone according to the present invention.
Figure 2:
FIG. 2 illustrates an application example of the present invention, showing the mounting device installed in a vehicle seat.

Referring to FIGS. 1 and 2, a hand-free handset according to the present invention is designed for use with a cellular telephone 20. The hand-free handset comprises a mounting block, for example, a socket 10 for mounting on one stem 30 of the head rest of a vehicle seat, a tightening up element, for example, a tightening up screw 11 for securing the socket 10 to the stem 30, a three-way tubular supporting member 14 having a first end fixedly connected to the socket 10, an ear phone 141 and a microphone 142 respectively and fixedly mounted on second and third ends of the three-way tubular supporting member 14 remote from the socket 10, an electric cable 12 having one end fastened to the inside of the three-way tubular supporting member 14 and connected to the ear phone 141 and the microphone 142 and an opposite end terminating in an electric connector 13 for connection to a voice signal input/output port at the cellular telephone 20. The three-way tubular supporting member 14 is made of flexible material that can be bent into the desired shape.

Referring to FIG. 2 again, when in use, the socket 10 is mounted around one stem 30 of the head rest of the vehicle seat, then the tightening up screw 11 is fastened up to fix the socket 10 in position, and then the electric connector 13 is connected to the voice signal input/output port of the cellular telephone 20. After installation, the ear phone 141 and the microphone 142 are respectively suspended from the three-way tubular supporting member 14 near the user's ear and mouth. Therefore, the user can speak to a person over the cellular phone 20 without holding it in hand.

While only one embodiment of the present invention has been shown and described, it will be understood that various modifications and changes could be made thereunto without departing from the spirit and scope of the invention disclosed.

What the invention claimed is:

1. A hand-free handset for use with a cellular telephone in an automobile, comprising:

a mounting device for fastening to one stem of the head rest of a vehicle seat;

a three-way tubular supporting member, said three-way supporting member having a first end fixedly connected to said mounting device, a second end, and a third end;

an ear phone fixedly mounted on the second end of said three-way tubular supporting member;

a microphone fixedly mounted on the third end of said three-way tubular supporting member; and an electric cable having one end fastened to the inside of said three-way tubular supporting member and connected to said ear phone and said microphone and an opposite end terminating in an electric connector for connection to a signal input/output port of a cellular telephone.

2. The hand-free handset of claim 1 wherein said mounting device comprises a socket for mounting around one stem of the head rest of a vehicle seat, and tightening up means for securing said socket to the stem of the head rest of the vehicle seat.

3. The hand-free handset of claim 2 wherein said tightening up means is a tightening up screw.

* * * * *